United States Patent [19]

Utamura et al.

[11] Patent Number: 4,734,249
[45] Date of Patent: Mar. 29, 1988

[54] NUCLEAR REACTOR START-UP METHOD

[75] Inventors: Motoaki Utamura, Kitaibaraki; Yasuhiro Masuhara, Hitachi; Atsuo Yamanouchi, Mito; Koichi Kotani; Masanori Naitoh, both of Hitachi, all of Japan

[73] Assignee: Hitachi, Ltd., Tokyo, Japan

[21] Appl. No.: 652,460

[22] Filed: Sep. 20, 1984

[30] Foreign Application Priority Data

Sep. 21, 1983 [JP] Japan .................. 56-173055

[51] Int. Cl.⁴ .............................................. G21C 7/00
[52] U.S. Cl. ................................ 376/214; 376/216; 376/370
[58] Field of Search ............... 376/210, 211, 214, 215, 376/216, 217, 247, 259, 361, 370

[56] References Cited

U.S. PATENT DOCUMENTS

| | | | |
|---|---|---|---|
| 3,700,552 | 10/1972 | Schluderberg | 376/361 |
| 4,077,836 | 3/1978 | Omori et al. | 376/214 |
| 4,278,051 | 7/1981 | Shida | 376/247 |
| 4,343,682 | 8/1982 | Grimes et al. | 376/214 |

FOREIGN PATENT DOCUMENTS

| | | | |
|---|---|---|---|
| 59-136686 | 8/1984 | Japan | 376/215 |
| 60-71992 | 4/1985 | Japan | 376/370 |

Primary Examiner—Deborah L. Kyle
Assistant Examiner—Richard L. Klein
Attorney, Agent, or Firm—Antonelli, Terry & Wands

[57] ABSTRACT

A nuclear reactor start-up method of starting up a boiling water reactor which is in the cold shut-down state. The method includes
setting a subcooled temperature of a coolant in a reactor core inlet to a range smaller than a critical subcooled temperature which is determined by the condition whereby the coolant starts boiling in the reactor core and the condition whereby the instability due to a periodic variation of buoyancy begins, .
thereafter starting an increase of power of the reactor.

7 Claims, 22 Drawing Figures

NUCLEAR REACTOR START-UP METHOD

BACKGROUND OF THE INVENTION

The present invention relates to a nuclear reactor start-up method after the cold shut-down and, more particularly, to a start-up method which is suitable for ensuring thermal-hydraulic stability of a nuclear reactor which is in the natural circulation state or in the state near it when the reactor is started up.

Generally, boiling water reactors have a characteristic such that a range (stability allowance) in which the nuclear reactor can be safely run at a low pressure or in the natural circulation state is narrow. Therefore, it is necessary to run the reactor in sufficient consideration of the stability allowance when the reactor is started up.

Figure 1:
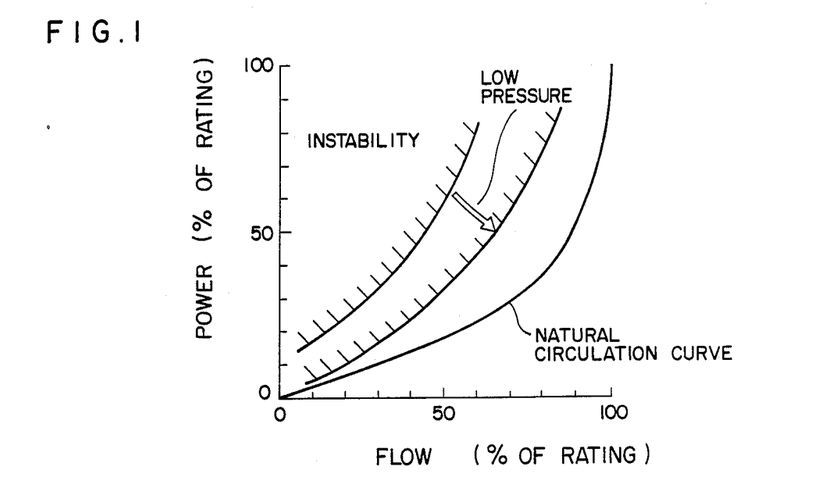
FIG. 1 shows the relationship between an power of a nuclear reactor in the natural circulation state and a reactor core flow.

FIG. 1 shows the relationship between a power of a nuclear reactor in the natural circulation state and a reactor core flow and an instability occurrence range based on conventional knowledge. It can be seen from this diagram that the range where the nuclear reactor can be safely run is narrow when a pressure and a flow are low. This is because the natural circulation flow is based on the balance between the buoyancy which is due to the difference between the density of coolant in the reactor core at a high temperature and that in the flow channel outside the reactor core at a low temperature, and the frictional loss of the vapor-liquid two-phase flow in the reactor core. When the pressure and flow are low, there is a tendency such that the variation in friction loss promotes the variation in natural circulation flow, causing the natural circulation flow to become unstable. This point will be described later.

Figure 2:
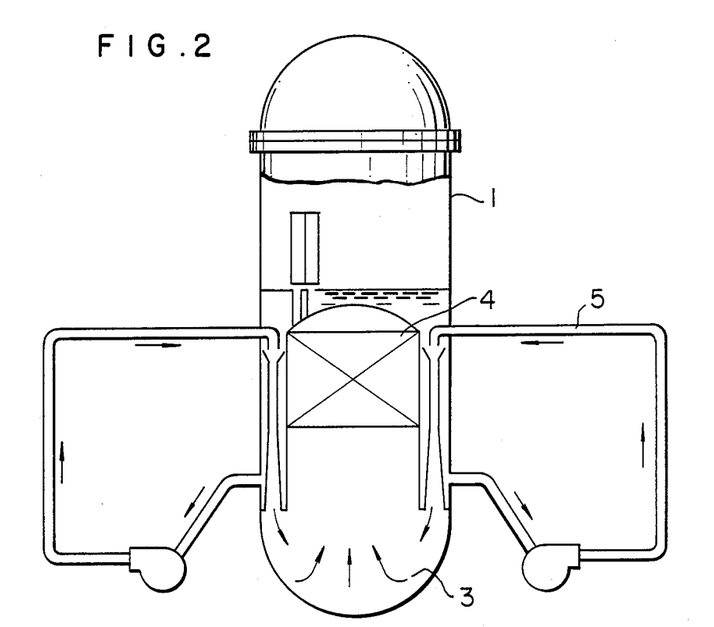
FIG. 2 shows a nuclear reactor having a recirculating system.
Figure 3:
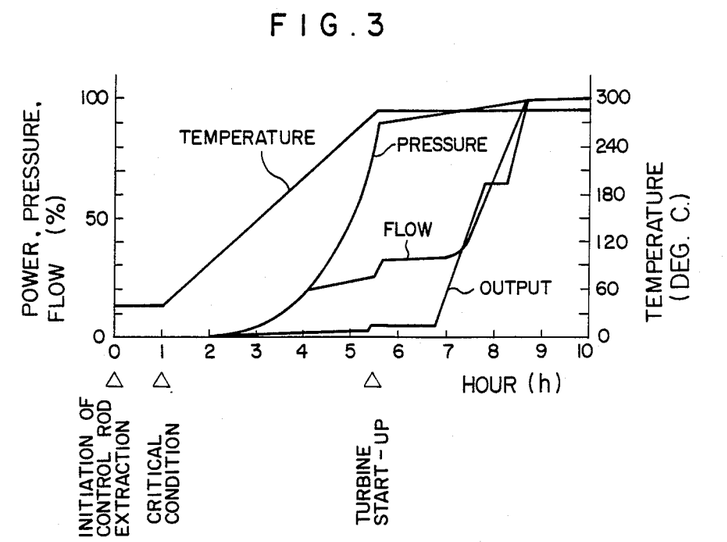
FIG. 3 shows a start-up map of a forced circulation type nuclear reactor.

In order to enhance the stability allowance, as shown in FIG. 2, a recirculating system 5 is provided in the outside of a pressure vessel 1 so as to forcedly circulate a cooling water 3. FIG. 3 is a start-up map showing a start-up method of a forced circulation type nuclear reactor. In this method, power is increased while the cooling water 3 is circulated at a pump speed of 20% of the rated speed. When the reactor is started up, as shown in FIG. 4, the use of such a method enables the stability allowance to be enlarged with respect to that in the case where the reactor is run in accordance with the natural circulation curve.

Figure 4:
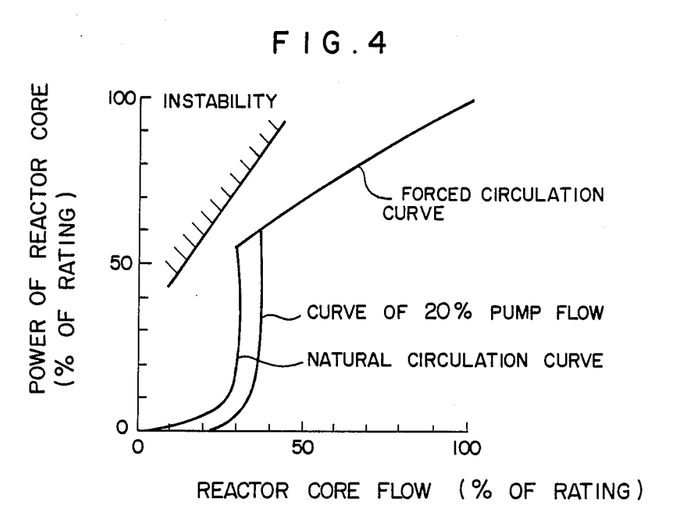
FIG. 4 shows a stability map of the forced circulation type nuclear reactor.
Figure 5:
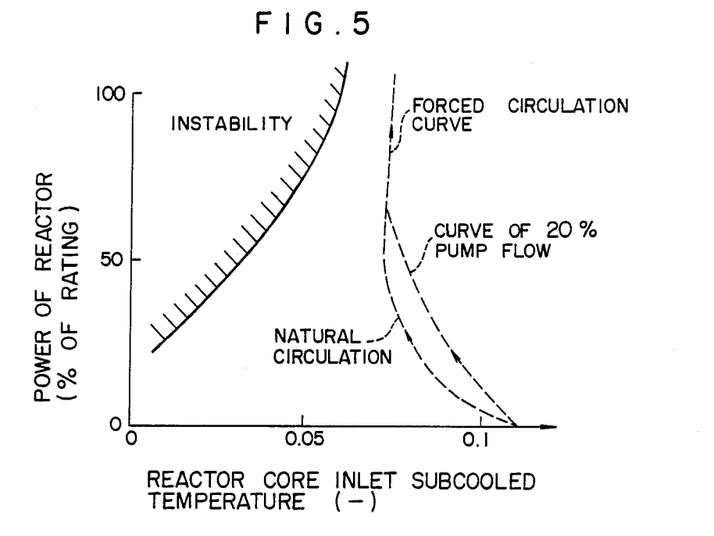

FIG. 5 shows an alternate expression of running curves of FIG. 4 in terms of a reactor inlet subcooled temperature $\Delta T$.

The subcooled temperature ($\Delta T$) is defined by the difference between a saturation temperature $T_B$ (a boiling point at a certain pressure P) of the cooling water 3 and an actual temperature $T_A$ of the cooling water 3, namely, by the following expression (1).

$$\Delta T = T_B - T_A \quad (1)$$

Since the boiling point $T_B$ depends on the pressure of the cooling water 3, we will have $$\Delta T = \Delta T (P) \quad (2)$$

In addition, the reactor core inlet subcooled temperature, therefore, denotes the subcooled temperature $\Delta T$ of the cooling water 3 flowing into the reactor core.

All of the above-mentioned conventional nuclear reactor start-up methods consider only the instability range regarding the variation of the natural circulation flow due to the variation in frictional loss mentioned above which has been known so far. However, in the case where the nuclear reactor is in the natural circulation state accompanied with generation of voids in the reactor core or in the state near the natural circulation (including the slight forced circulation flow) it has been found that another instability different from the mechanism of the above-mentioned instability exists. Thus, there is a problem such that the sufficient stability allowance cannot be ensured by the conventional nuclear reactor start-up method.

SUMMARY OF THE INVENTION

It is an object of the present invention to solve such a problem of the conventional technology in the above-mentioned reactor start-up method and to provide a nuclear reactor start-up method in accordance with the optimum running curve from the viewpoint of ensuring of stability of the nuclear reactor.

The present invention intends to allow the start-up of a nuclear reactor to be performed stably in any cases in consideration of both an instability mode (first instability mode) of a nuclear reactor which has been conventionally known and a second instability mode which was newly determined. In addition, after the reactor was started up in this way it is run along the running curve such that the variation of the reactor power responding to the disturbance becomes minimum (damping ratio becomes minimum).

Other objects and features of the invention will be apparent from the following description taken in conjunction with the accompanying drawings.

BRIEF DESCRIPTION OF THE DRAWINGS

FIG. 5 shows running curves of a forced circulation type nuclear reactor with respect to reactor inlet subcooled temperature of;

DESCRIPTION OF THE PREFERRED EMBODIMENTS

A mechanism for occurrence of the second instability mode, which became a motive for this invention, and its feature will be described hereinbelow in conjunction with the first instability mode.

Figure 6:
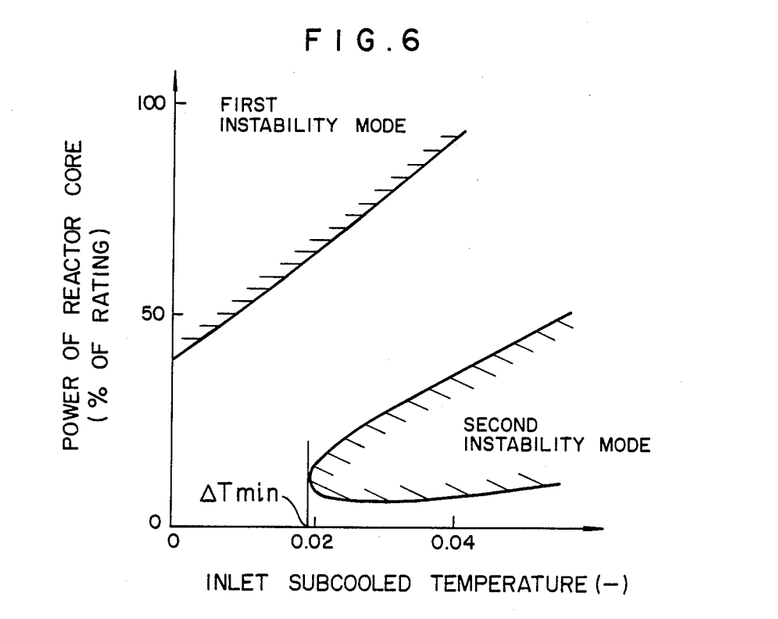
FIG. 6 shows a stability map including the second instability mode.

FIG. 6 shows a range occurring in the second instability mode using a power of a nuclear reactor and a subcooled temperature of a coolant in the reactor core inlet. The first instability mode is also indicated in the diagram for comparison. It is apparent from the diagram that the first instability mode is caused under the conditions of a low subcooled temperature and a high power; on the contrary, the second instability mode is caused under the conditions of a high subcooled temperature and a low power. The former is caused in the state whereby an outlet quality x (this will be explained later) of the reactor core is high; on the other hand, the latter is caused under the condition whereby such a quality is low. The mechanism will be explained as follows.

The above-mentioned outlet quality x is defined by $$x = \frac{m_V}{m_T} \quad (3)$$

where, $m_V$; mass of water vapor which passes through the reactor core outlet in a unit time, $m_T$; total mass of cooling water which passes through the reactor core outlet in a unit time.

Figure 7:
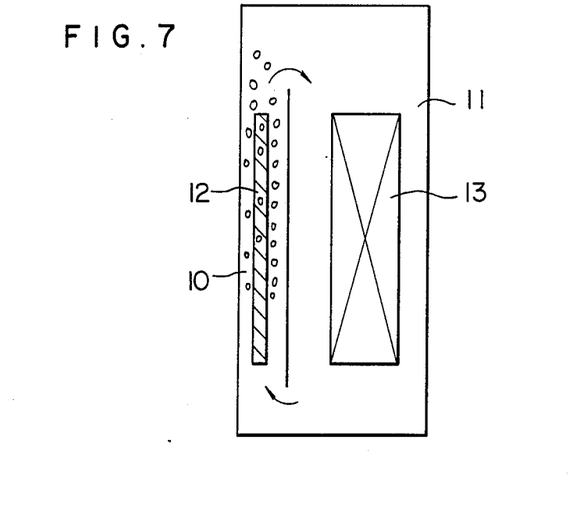
FIG. 7 shows a mechanism of natural circulation in a boiling water reactor.
Figure 8:
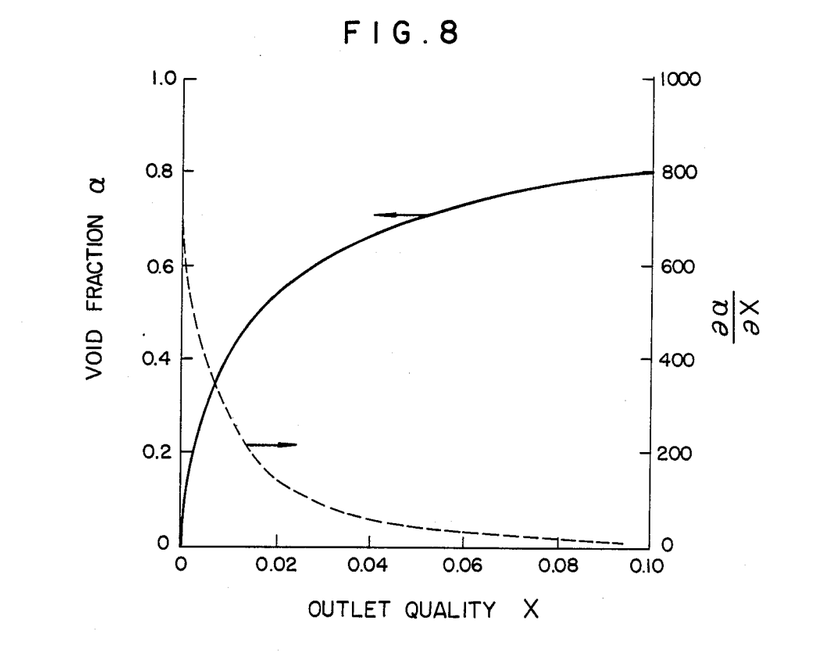
FIG. 8 shows the relationship between quality in two-phase flow and a void rate.

A natural circulation flow Q is determined by the balance between buoyancy F which is caused due to the difference between the density of the coolant in an ascending channel 10 and that in a descending channel 11 in a boiling circuit as shown in FIG. 7 and a two-phase frictional loss $\Delta P$ mainly in the ascending channel. It can be considered that the buoyancy F is a function F ($\alpha$) of a void fraction $\alpha$ and the frictional loss $\Delta P$ is a function $\Delta P$ (x, Q) of the quality x and flow Q. On the other hand, there is generally a relationship as shown in FIG. 8 between the void fraction in the two-phase flow and quality. Now, the response of the system when a flow disturbance $\delta Q$ is applied in the boiling circuit shown in FIG. 7 will be discussed.

First instability mode:

As can be seen from FIG. 8, a change in $$\frac{\partial \alpha}{\partial x}$$

of the void fraction with respect to a variation in quality is small in the high-quality range (x>0.10). Therefore, a change amount $$\frac{\delta \alpha}{\delta Q}$$

of the void fraction with respect to a variation amount $\delta Q$ equivalent to the change amount $\delta x$ is also small, so that it can be considered that the buoyancy is virtually little influenced ($\delta F=0$) by the variation amount $\delta Q$ because of change in void fraction in the high-quality range. On the other hand, the frictional loss $\Delta P$ is given by the following expression.

$$\Delta P(x, Q) \, \tau \phi^2(x) \, Q^2 \quad (4)$$

where, $\phi^2(x)$: two-phase flow multiplication factor.

Thus, a friction coefficient for single phase flow $\delta \Delta P$ of $\Delta P$ to $\delta Q$ will be given by the following expression (5).

$$\frac{\partial P}{\partial Q} = \left( \frac{\partial \phi^2(x)}{\partial x} \cdot \frac{\partial x}{\partial Q} + 2Q \cdot \phi^2(x) \right) \quad (5)$$

Figure 9:
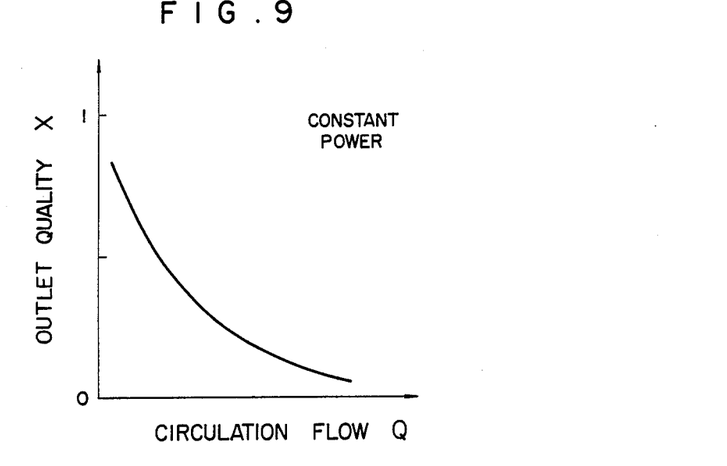
FIG. 9 shows the relationship between a circulation flow and outlet quality.

As shown in FIG. 9, the phase of the outlet quality variation $\delta x$ is inverted for the flow variation $\delta Q$, so that $$\frac{\partial x}{\partial Q} < 0.$$

Figure 10:
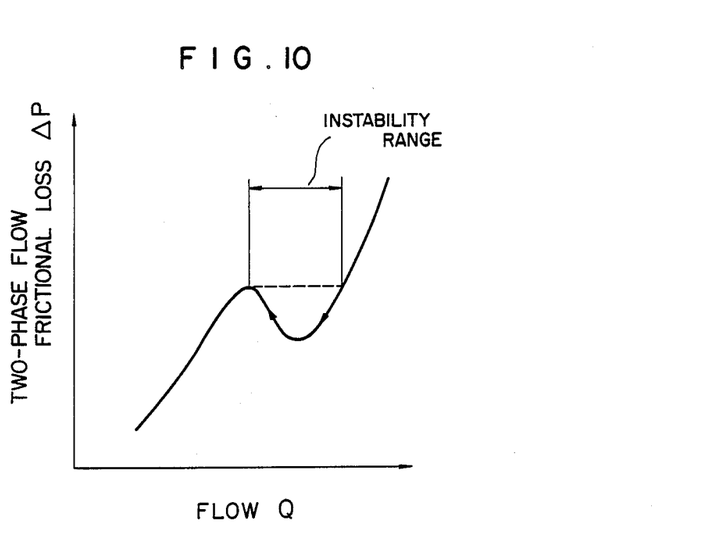
FIG. 10 is a graph showing the relationship between $\Delta P$ and Q in the first instability mode.

In addition, since it has been known that $$\frac{\partial \phi^2}{\partial x} > 0,$$

the first term of the right side of expression (5) has a negative sign and the second term has a positive sign. Therefore, under the condition where the left side of expression (5) is smaller than 0 (this relation is satisfied under the high-quality condition), the frictional loss decreases to the positive flow variation, so that the flow variation is exaggerated and the instability occurs. FIG. 10 shows a range of occurrence of the instability (runaway type instability) of the above-mentioned mechanism by a $\Delta P - Q$ diagram. As described above, the first instability mode is caused due to the hydraulic negative resistance.

Figure 11A:
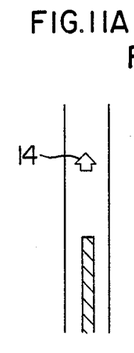
FIGS. 11A through 11D show a mechanism for occurrence of the second instability mode.
Figure 11B:
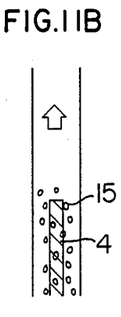
Figures 11C, 11D, 11E:
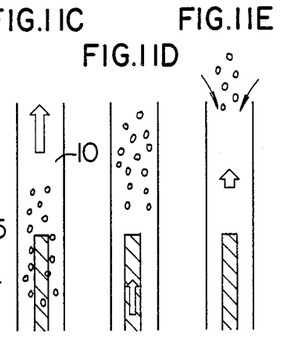

Second instability mode:

In FIG. 8, in the low-quality range, $$\frac{\partial \alpha}{\partial x}$$

shows a larger sensitivity to the quality variation $\delta x$, therefore, to the flow variation $\delta Q$. Consequently, in this range, a variation $\delta F$ in driving force (buoyancy) dominates the phenomenon, contrary to the first instability mode. Namely, when a decrease $\delta x$ in outlet quality occurs to the positive flow variation $\delta Q$, a rapid decrease $\delta \alpha$ in void fraction occurs from FIG. 8. Thus, the flow rapidly decreases immediately after the end of action of the disturbance $\delta Q$, enhancement of rapid boiling will have occurred, due to heat transmitted to the unit mass of coolant. Since an increase in void due to the boiling serves to increase the driving force δF, the flow will be again increased and returned to the original state. This cycle continues the unstable state. Phenomenon logical explanation on the mechanism of the second instability follows. When the negative flow variation δQ is added (FIG. 11A) in the state whereby the power of the reactor core is small and flow rate of a natural circulation is low, voids 15 are suddenly generated (FIG. 11B) in a reactor core section 4. Thus, the buoyancy is caused and the driving force for circulating the reactor water is promoted (FIG. 11B). This results in an increase in flow velocity of coolant in the reactor core section which accompanies entry of cooled water at the core inlet so that the boiling is stopped (FIG. 11D). This state continues until the voids 15 reach the top of the ascending channel 10 and are dispelled. However, after the voids 15 were dispelled, the cooling water transiently and reversely flows from the top into the ascending channel 10 (FIG. 11E). Thus, the flow of the cooling water in the ascending channel 10 is retained as it is and the state shown in FIG. 11A is again realized.

The above-mentioned phenomena are repeated, so that the variation in flow and the generation and extinction of the voids periodically occur. In this way, it can be said that the second instability mode is caused due to the variation in buoyancy δF, i.e., the variation in the void fraction δα in the reactor core.

Figure 12:
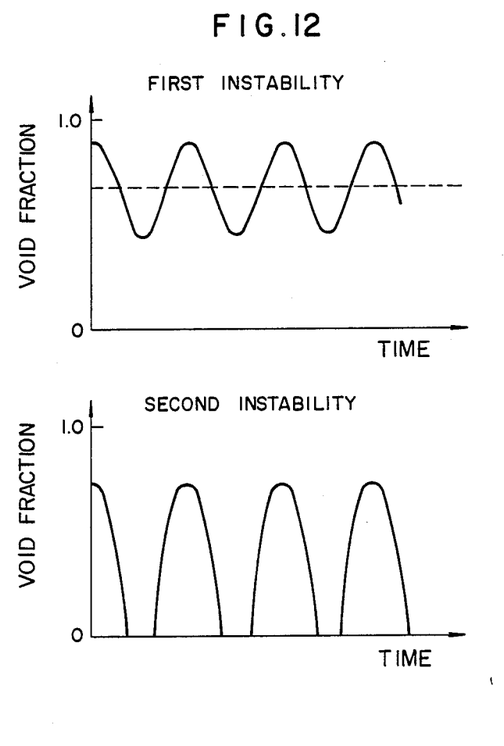
FIG. 12 shows a variation in void fraction when the instability occurs.

The line history of the void fraction α when the instability occurs shows a typical waveform as shown in FIG. 12 in dependence upon the instability mode.

Figure 13:
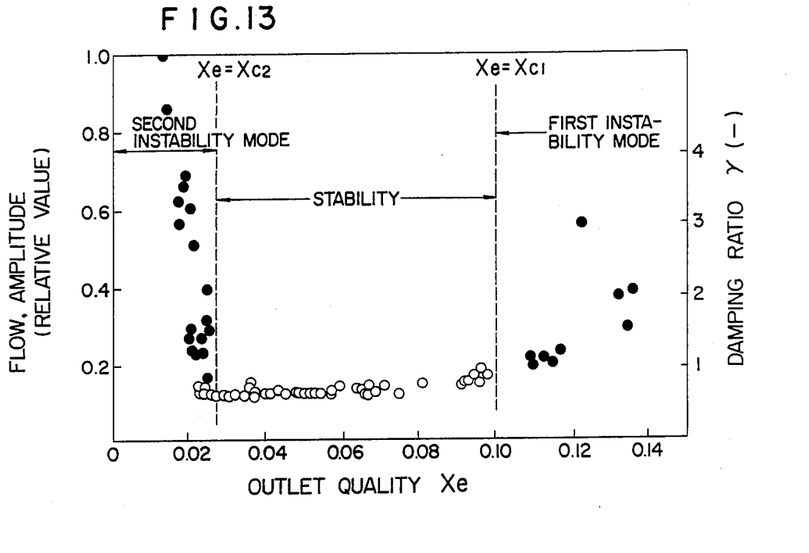
FIG. 13 shows the relationship between outlet quality and a damping ratio.
Figure 14:
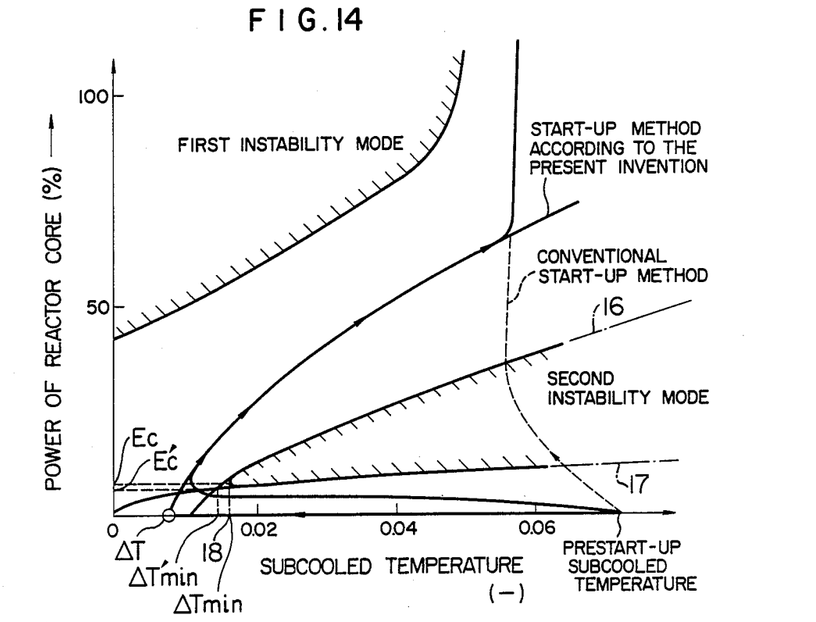
FIG. 14 shows a start-up map according to the present invention.

On the other hand, as shown in FIG. 6, the minimum value $\Delta T_{min}$ of subcooled temperature exists in the range of occurrence of the second instability mode. This point shows the state as will be explained hereinbelow. The experiment has been carried out using the natural circulating circuit having the heat generation section and cooling section as shown in FIG. 7. Thus, as shown in FIG. 13, it has been found that the range where the instability occurs are directly determined by the outlet quality of the boiling section 10. In addition, it has been found that no instability occurs in the non-boiled state. It is assumed that the outlet quality at which the instability occurs is called a critical quality $x_c$. Critical qualities $x_{c1}$ and $x_{c2}$ at which the first and second instability modes begin have the values on the order of 0.1 and 0.01, respectively. When a critical quality 16 regarding the second instability mode is indicated on the diagram showing the relationships between an power of the nuclear reactor and a reactor core inlet subcooled temperature, FIG. 14 is derived. The range of occurrence of the second instability mode can be represented as the region surrounded by this critical quality curve 16 x(E, ΔT)=$x_{c2}$ and a boiling initiation curve 17 x(E, ΔT) ≃0. Therefore, a minimum subcooled temperature 18 of the second instability mode, $\Delta T_{min}$ and a power $E_c$ of the nuclear reactor corresponding thereto can be approximated by solutions of the following simultaneous equations.

$$x(E_o, \Delta T_{min}) = x_{c2}$$
$$x(E'_o, \Delta T_{min}) = 0 \quad \quad \quad (6)$$

Namely, $\Delta T'_{min}$ is given as a crossing point between the curve 16 indicative of the critical quality and the boiling start curve 17 in the output subcooled temperature diagram.

As can be seen from FIG. 14, the actual minimum subcooled temperature $\Delta T_{min}$ obtained by the experiment is slightly shifted from the minimum subcooled temperature $\Delta T'_{min}$ which is obtained by solving the above simultaneous equations (6). Namely, there is a difference between the theoretical value and the experimental value. However, since the theoretical value $\Delta T'_{min}$ is located on the safer side than the experimental value $\Delta T_{min}$, the nuclear reactor start-up method of the present invention will then be described using the theoretical value $\Delta T'_{min}$.

A feature of the running method according to the invention is that a starting point is set so that a reactor core inlet subcooled temperature ΔT at the start point where the reactor output increases lie within a range where the following relation $$\Delta T < \Delta T'_{min} \quad \quad \quad (7)$$

is satisfied as shown in FIG. 14 in order to avoid the second instability mode. Alternatively, the nuclear heat generation is started from the beginning and the nuclear heat generation rate is maintained in a range where no void is produced in the reactor core, and the subcooled temperature is reduced until the above inequality (7) is satisfied. On the contrary, according to a conventional running method, as shown in FIG. 14, the running curve crosses the second instability range, so that this causes the transient instability in the low-power range.

A second feature of the running method of the invention relates to the running method in intermediate power range. This point will then be described hereinbelow.

Figure 22:
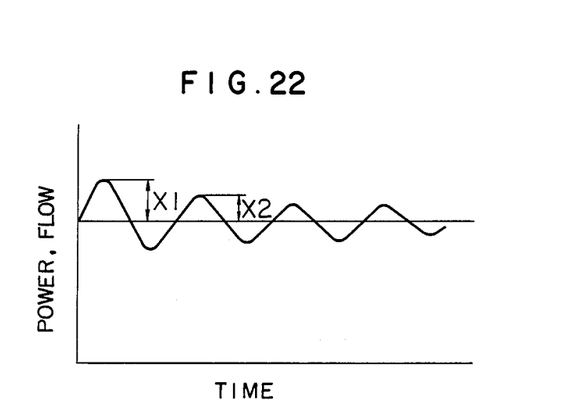
FIG. 22 shows the relationship between a damping ratio and an output.

For the nuclear reactor, it is run and designed to avoid such an instability phenomenon that the power or flow oscillates and diffuses as the time elapses. FIG. 22 shows the states of oscillations of the flow and output. A ratio $X_2/X_1$ of the amplitudes of the adjacent waves is called a damping ratio. It can be said that it is stable when $X_2/X_1 < 1$ and it is unstable when $X_2/X_1 > 1$.

Figure 15:
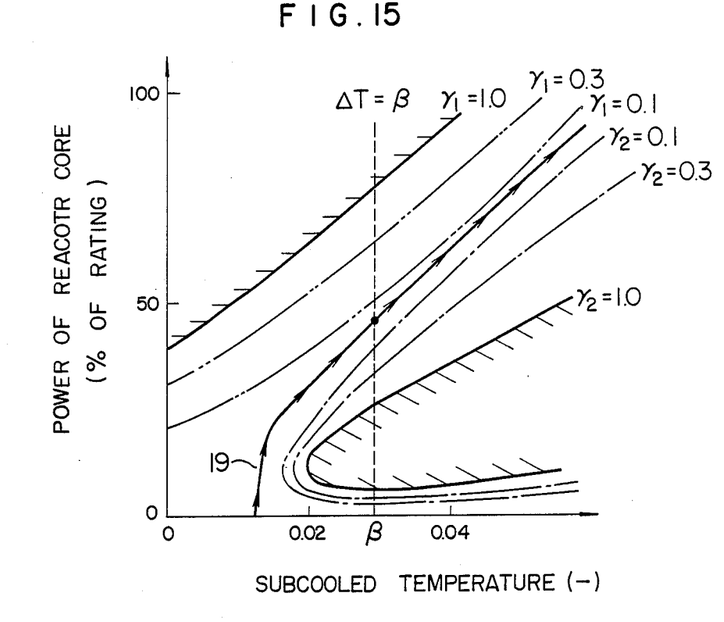
FIG. 15 shows a contour map of the damping ratio.
Figure 16:
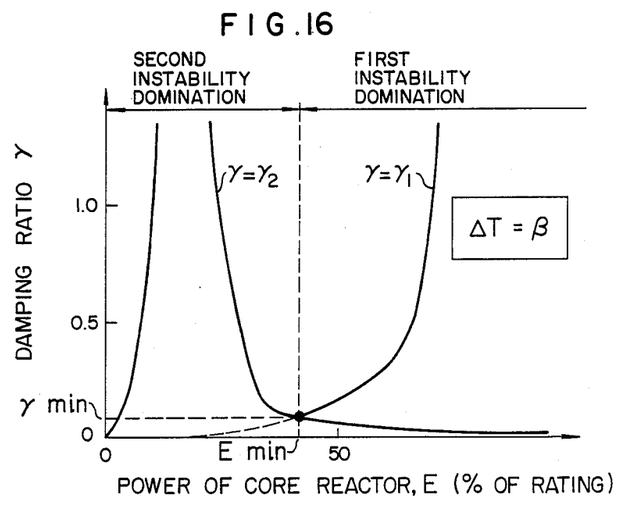
FIG. 16 shows a cross-sectional view of the contour map in FIG. 15 taking along a line crossing a point B.

FIG. 15 shows a contour map of a damping ratio γ. The contour map of γ=1.0 denotes the boundary portion between the instability and the stability. FIG. 16 shows dependence of the damping ratio γ on a reactor core output E when ΔT was fixed to an arbitrary value β shown in FIG. 15. It will be understood from this diagram that a power $E_{min}$ at which the damping ratio γ becomes minimum exists. When $E_{min}$ is obtained with respect to each subcooled temperature, an optimum running curve 19 whereby the damping ratio γ becomes minimum as shown in FIG. 16 is obtained. When the damping ratio γ is minimum, this means that the attenuating speed of the disturbance is fastest, in other words, the system is in the most stable state for the disturbance.

The present invention will be further described in detail with respect to an embodiment.

Figure 17:
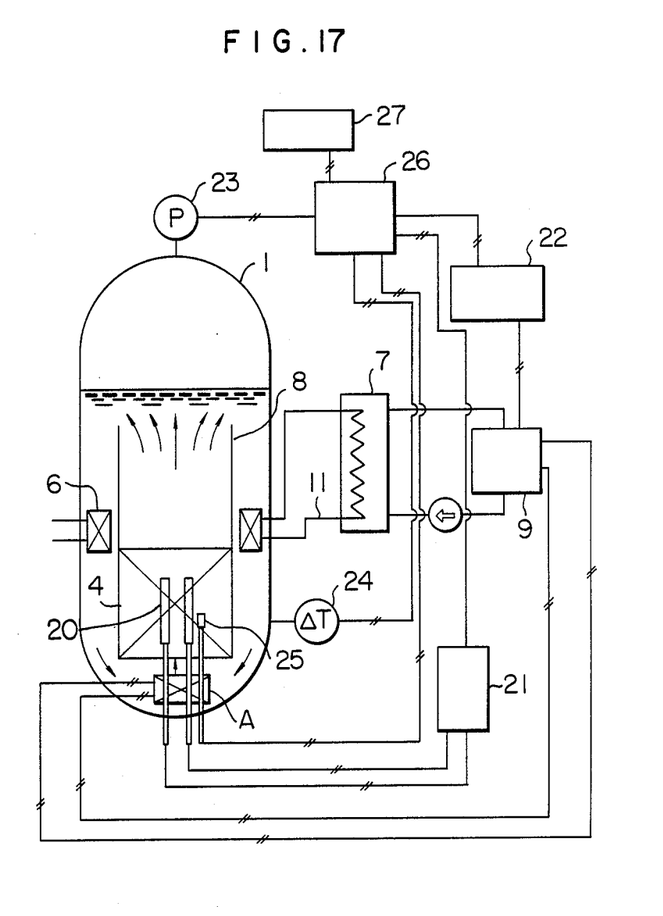
FIG. 17 shows the natural circulation type nuclear reactor having the heat exchanger and a control system thereof.

FIG. 17 illustrates an arrangement of a natural circulation type nuclear reactor including a heat exchanger 6 therein and its control system. The reactor comprises: the pressure vessel 1; the reactor core 4; a riser 8; the heat exchanger 6; a heat exchanger A; and control rods 20. The control system includes an output control system 21 and a subcooled temperature control system 22. The detection signal includes a pressure signal 23, a reactor core inlet subcooled temperature signal 24 and an LPRM (Local Power Range Monitor) signal 25. Further, there are provided a computer 26 including a program for calculating the optimum start-up curve 19 therein and a CRT 27 for indicating the running state. The start-up method for the nuclear reactor according to an embodiment of the present invention having such an arrangement is as follows. The computer 26 receives the pressure signal 23 at a time interval, thereby allowing the instability map and optimum running curve 19 at that pressure to be displayed on the CRT 27. The computer 26 also receives the subcooled signal 24 and LPRM signal 25, thereby allowing the current running state to be indicated on the CRT 27. The start-up procedure is as follows. The temperature of the coolant in the pressure vessel 1 is increased through the heat exchanger A by the subcooled temperature control system 22, thereby reducing the subcooled temperature $\Delta T$. When $\Delta T$ reaches the state whereby expression (7) is satisfied, the output control system 21 is made operative, so that the pulling-out of the control rods 20 is started. On one hand, the heat exchanger 6 is made operative when it is necessary to reduce the subcooled temperature. The output of the reactor is observed by the LPRM signal 25. In order to increase the reactor output along the optimum running curve 19, a subcooled temperature control amount $\delta(\Delta T)$ to an output variation $\delta E$ may be set to a value which is given by the following expression (8).

$$\delta(\Delta T) = \left\{ \left( \frac{\partial \Delta T}{\partial P} \right) E_0 \times \frac{\partial P}{\partial E} + \left( \frac{\partial \Delta T}{\partial E} \right)_{P_0} \right\} \delta E \quad (8)$$

where, $\Delta T$: subcooled temperature on the optimum running curve when the reactor output and pressure were applied.

With such a running method, there is an effect such that the nuclear reactor can be started up while the most stable state is held for the disturbance.

Figure 18:
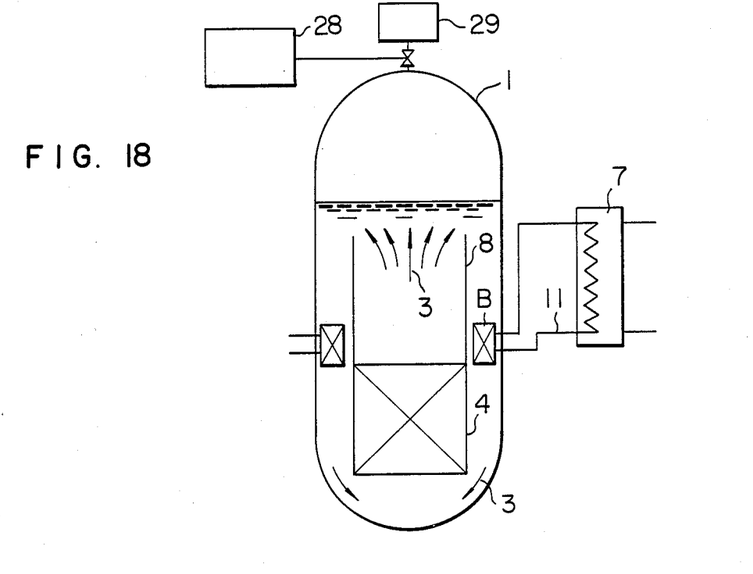
FIG. 18 shows a natural circulation type nuclear reactor having a pressure control system.
Figure 19:
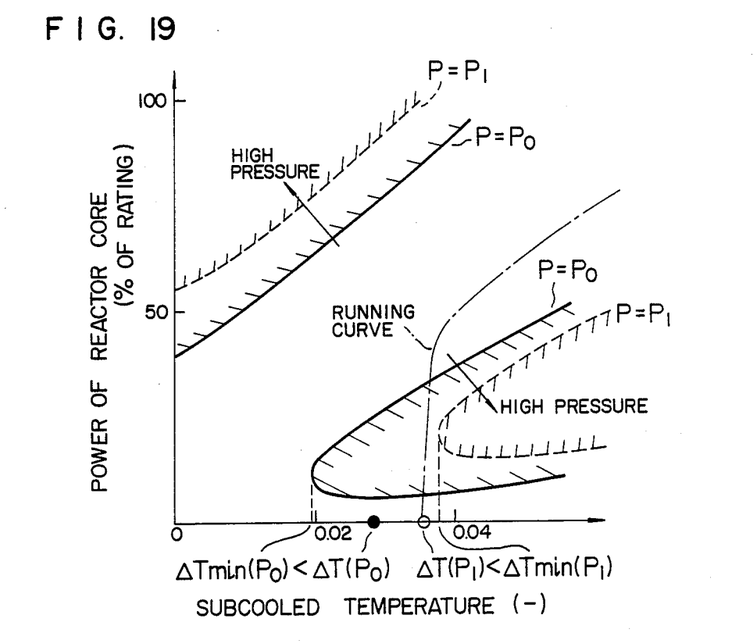
FIG. 19 shows dependence of the instability range on system pressure.

As another embodiment of the invention, it is possible to consider a natural circulation type nuclear reactor system having an accumulator 29 and a pressure control system 28 as shown in FIG. 18. If the pressure can be controlled, the instability range itself can be controlled as shown in FIG. 19, so that the running range is widened. In addition, since the initial pressure can be applied, the range of occurrence of the second instability mode largely moves backwardly on the side of high subcooled temperature, so that the range where the reactor can be stably run is widened. Thus, there is no need to perform the operation for elevating the temperature of coolant before the control rods 20 are pulled out and there is an effect such that the reactor can be easily started up in a short time.

Figure 20:
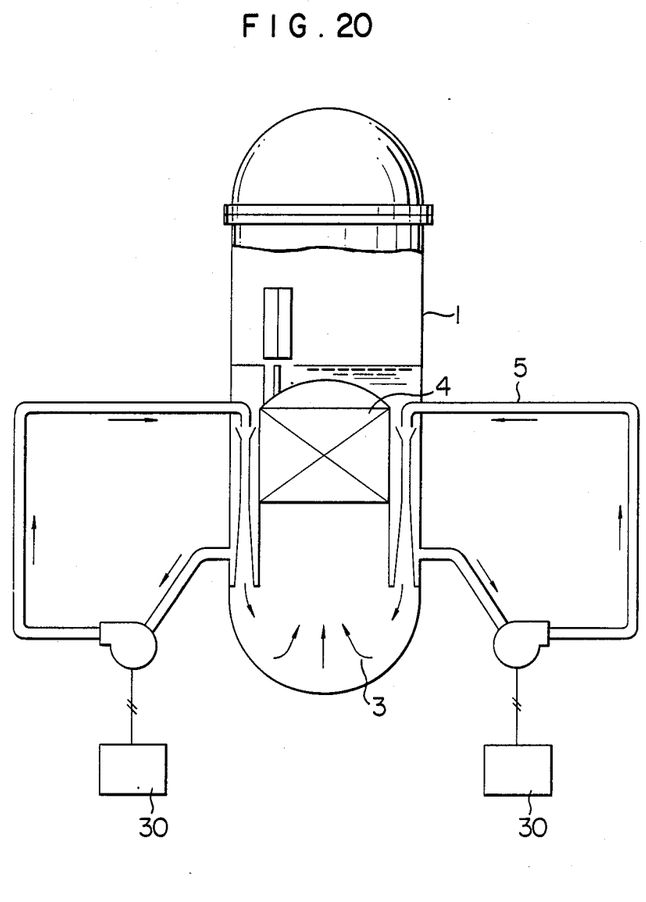
FIG. 20 shows a forced circulation type nuclear reactor having a flow control system.
Figure 21:
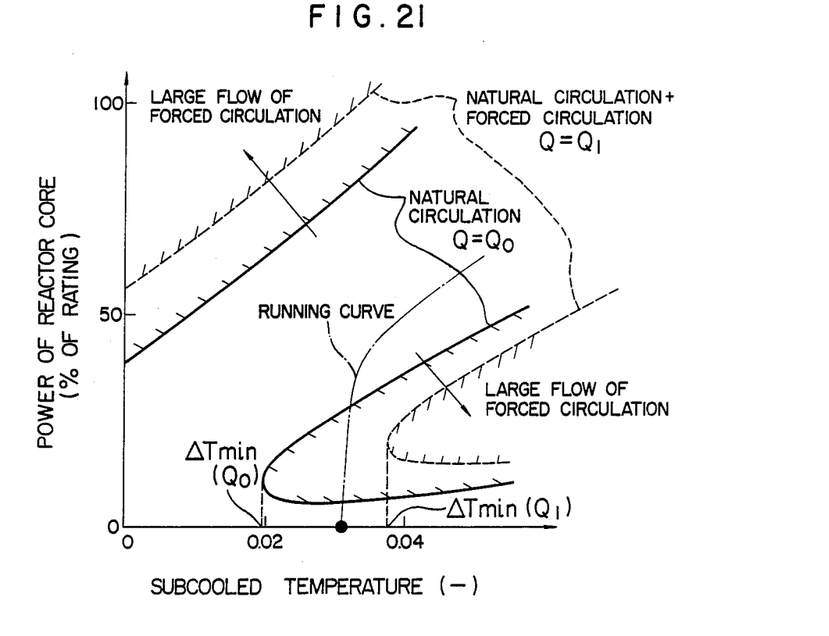
FIG. 21 shows dependence of the instability range on flow rate.

A third embodiment according to the present invention is shown in FIG. 20. In this embodiment, the forced circulation loop 5 and a flow control system 30 are provided in the outside. FIG. 21 shows the result of calculation of the stability map by use of a calculation program in which the model of the second instability mode was built in the case where the reactor core flow was supplemented from the outside. It will be understood that the stable running range can be widened if the reactor core flow is increased by driving the recirculation loop 5 in addition to the natural circulation. If $\Delta T_{min}$ is increased by supplementing the flow, and if this accomplishes the state which exceeds the subcooled temperature when the running was started, there will be an effect such that the nuclear reactor can be started up without increasing the temperature and pressure upon start-up.

According to the present invention, since the start-up method can be designed in consideration of the existence of the second instability mode, the nuclear reactor which is in the natural circulation state or in the state near it can be started up in the stable state. Further, according to the invention, the nuclear reactor can be started up along the optimum running curve which is made by being coupled to the running state whereby the reactor becomes most stable for the disturbance, so that the reactor can be most stably run and it is possible to prevent an excessive temperature rise of fuel rod in association with the variations in flow and void. In addition, as a result of these effects, the MCPR (Minimum Critical Power Ratio) can be reduced, so that more reactor power can be gained.

What is claimed is:

1. A method of starting up a boiling water nuclear reactor in a cold shut-down condition, comprising the steps of:
    i. forming a map of an output E-vs-subcooled temperature in accordance with the output E of the nuclear reactor core, and with the subcooled temperature $\Delta T(P)$ of coolant at a reactor core inlet, which is a function of the pressure P of the coolant and which is determined by the following equation:

$$\Delta T(P) = T_B - T_C \quad (1)$$

where $T_B$ is the boiling point of coolant under a predetermined pressure (saturation temperature), and
    $T_C$ is the actual temperature of the coolant under the predetermined pressure;
    ii. plotting outlet quality curves $x(E, \Delta T)$ on the map which outlet quality curves are determined by the following equation on the map:

$$x = m_V/m_T \quad (2)$$

where $m_V$ is the mass of vapor passing through the reactor core outlet per unit time, and
    $m_T$ is the total mass of coolant passing said through the reactor core outlet per unit time;
    iii. determining critical quality curves among a group of outlet quality curves on the map, the critical quality curves being obtained by the following equations:

$$x(E, \Delta T) = x_{c1} \quad (3)$$
    $$X(E, \Delta T) = x_{c2} \quad (4)$$

where $x_{c1} > x_{c2}$,
    the critical guality curves defining boundaries along which first and second instabilities occur;
    iv. selecting one of the outlet quality curves, corresponding to a boiling initiation curve which is obtained from the following equation:

$$x(E, \Delta T) = 0 \quad (5);$$

v. determining a minimum subcooled temperature $\Delta T'min$ which is crossing point between the boiling initiation curve of equation (5) and the critical quality curve of equation (4) relating to the second instability; and
    vi. starting increase of the output E of the nuclear reactor core from zero output at a point having a subcooled temperature of the coolant at the nuclear reactor core inlet which satisfies the following condition: $\Delta T < \Delta T'\min$, between the critical quality curves of equation (3) and equation (4) on the map.

2. A method according to claim 1, wherein values $x_{c1}$ and $x_{c2}$ for the critical quality curves of the equations (3) and (4) are 0.1 and 0.01, respectively.

3. A method according to claim 1, wherein the setting of the subcooled temperature $\Delta T(P)$ of the coolant at the nuclear reactor core inlet is effected by increasing the temperature of the coolant.

4. A method according to claim 1, wherein the setting of the subcooled temperature of the coolant at the nuclear reactor core inlet is effected by increasing the pressure of the nuclear reactor.

5. A method according to claim 1, wherein the setting of the subcooled temperature of the coolant at the nuclear reactore core inlet is effected by increasing the flow of the coolant passing through the nuclear reactor core under forced circulation.

6. A method according to claim 1, wherein after the output E of the nuclear reactor core is started to be increased at a subcooled temperature of the coolant at the nuclear reactor core inlet below the minimum subcooled temperature $\Delta T'\min$, the output power E is increased along one of the outlet quality curves extending within the area between the critical quality curves of equations (3) and (4) on the map.

7. A method according to claim 1, wherein the output power E is increased along an outlet quality curve having a minimum damping ratio of variations in the flow of the coolant passing through the nuclear reactor core.

* * * * *